United States Patent [19]

Albright et al.

[11] 4,253,680
[45] Mar. 3, 1981

[54] HITCH FACILITATING

[76] Inventors: John M. Albright, 5921 Green Dr., Memphis, Tenn. 38118; Steven G. Goode, 3351 Ladue, Memphis, Tenn. 38127

[21] Appl. No.: 19,439

[22] Filed: Mar. 9, 1979

[51] Int. Cl.³ .............................................. B60D 1/14
[52] U.S. Cl. .............................. 280/479 R; 254/86 R; 280/405 R; 280/406 A; 280/431; 280/475; 280/766
[58] Field of Search ................................ 254/86 R, 45; 280/405 R, 406 A, 406 R, 407, 6.1, 6 R, 446, 431, 475, 477, 479 R, 763, 766

[56] References Cited

U.S. PATENT DOCUMENTS

| 2,940,776 | 6/1960 | Curtis | 280/406 A |
|---|---|---|---|
| 3,075,790 | 1/1963 | Hansen et al. | 280/475 |
| 3,592,443 | 7/1971 | Budrow | 254/86 R |
| 3,912,289 | 10/1975 | Czajkowski, Jr. | 280/6.1 |
| 4,053,174 | 10/1977 | Guettler, Jr. | 280/406 A |
| 4,103,869 | 8/1978 | Mesny et al. | 254/86 R |

Primary Examiner—John J. Love
Assistant Examiner—Donn McGiehan
Attorney, Agent, or Firm—Walker & McKenzie

[57] ABSTRACT

A hitch for allowing a trailer to be first disconnected from a vehicle, to be then jacked so it is level with the support surface, and then be automatically jacked back to the level of the vehicle so that it can be easily reconnected to the vehicle. A switch is pivotally associated with the trailer for movement in a plane parallel to a vertical plane extending along the longitudinal axis of the trailer. A lock is provided for locking the switch in any one of an infinite number of positions with the longitudinal axis of the switch in the plane parallel to the vertical plane extending along the longitudinal axis of the trailer.

6 Claims, 12 Drawing Figures

HITCH FACILITATING

BACKGROUND OF THE INVENTION

1. Field of the Invention

This invention relates in general to trailers and more specifically to a hitch means for removably connecting a travel trailer to a tow vehicle.

2. Description of the Prior Art

Travel trailers and the like are normally hitched to tow vehicles by way of a ball-like member attached to the vehicle and a cup-like member attached to the trailer for placement over the ball-like member. Hansen, U.S. Pat. No. 3,075,790, discloses a mechanism for facilitating the connecting of an agricultural implement to a farm tractor. More specifically, the Hansen patent discloses a mechanism including a hydraulic piston connected to the implement in such a way that the front end of the implement can be raised or lowered by operation of the piston. In utilizing the Hansen mechanism, a person activates the piston while visually watching the relationship of the front end of the implement to the hitch mechanism of the tractor until the front end of the implement is substantially aligned with the hitch mechanism of the tractor. The Hansen mechanism does not disclose or suggest the present invention.

The following U.S. patents may be of interest: Knudsen, U.S. Pat. No. 2,560,769; Fitch, U.S. Pat. No. 2,664,299; Barnhart, U.S. Pat. No. 2,374,320; and Eranosian, U.S. Pat. No. 3,669,409. None of the above patents disclose or suggest the present invention.

SUMMARY OF THE INVENTION

The present invention is directed toward improving upon prior means for and methods of hitching trailers to tow vehicles. The concept of the present invention is to provide a hitch means which will automatically realign the hitch mechanism of a trailer with the hitch mechanism of a tow vehicle.

The hitch means of the present invention includes, in general, a first coupling means for being attached to the trailer; a second coupling means for being attached to the vehicle; attachment means for attaching the first and second coupling means to one another; electrically controlled jack means associated with the first coupling means for causing the first coupling means to be raised or lowered with respect to the supporting surface of the trailer; electric circuit means including a pivot switch means for controlling the jack means, the pivot switch means being pivotally associated with the trailer for movement with the longitudinal axis of the pivot switch means in a plane parallel to a vertical longitudinal plane of the trailer; and lock means for locking the pivot switch means in any one of an infinite number of positions with the longitudinal axis of the pivot switch means in the plane parallel to the vertical longitudinal plane of the trailer. The pivot switch means is associated with the jack means in such a manner that it activates the jack means whenever the circuit means directs electrical current to the pivot switch means and the longitudinal axis of the pivot switch means is not horizontal.

DESCRIPTION OF THE PREFERRED EMBODIMENT

The hitch means 11 of the present invention is for removably connecting a trailer 13 such as a travel trailer to a tow vehicle 15 such as an automobile. The trailer 13 and vehicle 15 rest upon a supporting surface 17 such as the ground (see FIG. 1). The trailer 13 has a longitudinal axis as indicated by the broken line 19 in FIG. 2.

Figure 1:
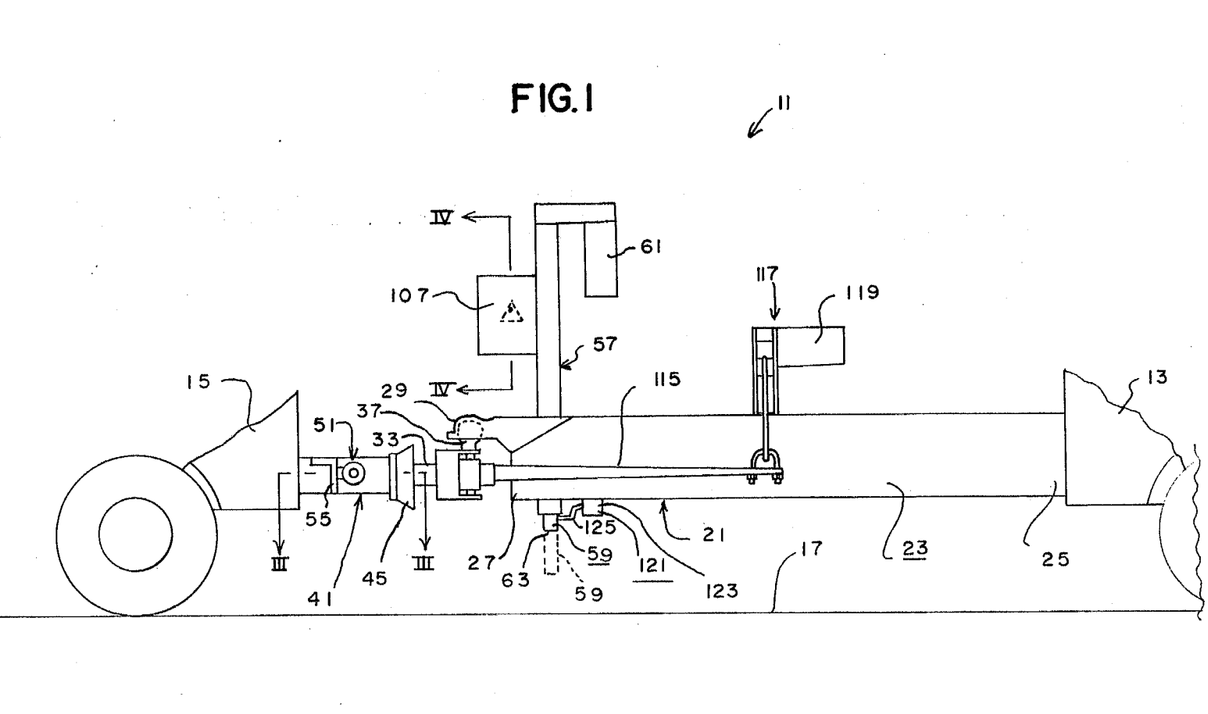
FIG. 1 is a side elevational view of the hitch means of the present invention shown connecting a trailer to a vehicle.
Figure 2:
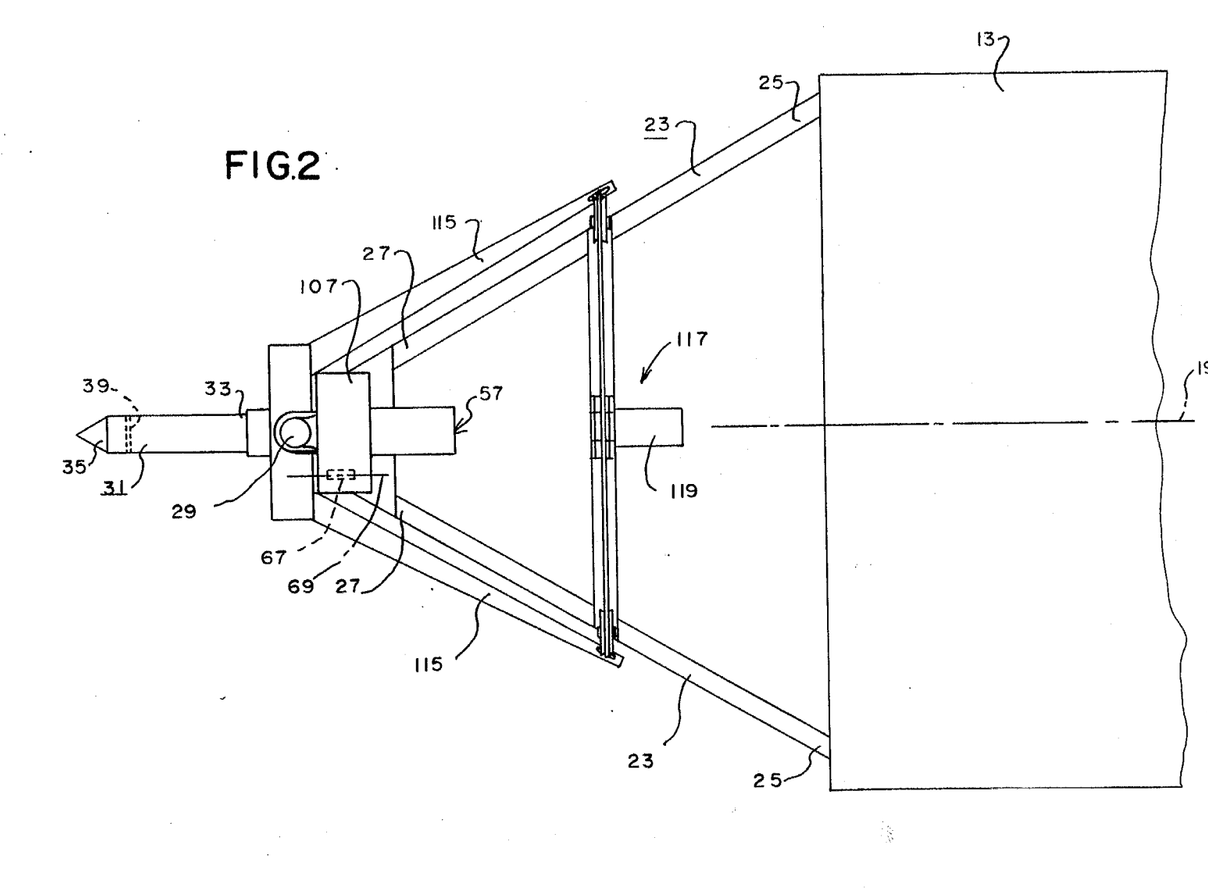
FIG. 2 is a top plan view of a portion of the hitch means of the present invention shown attached to a trailer.

The hitch means 11 includes a first coupling means 21 attached to the trailer 13 (see, in general, FIGS. 1 and 2). The first coupling means 21 preferably includes a tongue structure 23 having a first end 25 fixedly attached to the trailer 13 and having a second end 27. The second end 27 of the tongue structure 23 preferably terminates in a cup-like member 29 substantially identical to the cup-like member of a normal ball and socket type hitch mechanism. The tongue structure 23 may preferably consist of the normal tongue structure of a travel trailer or the like and may be a part of the frame of such a trailer as will be apparent to those skilled in the art. The first coupling means 21 preferably includes a rod member 31 having a first end 33 and a second end 35. The first end 33 of the rod member 31 is attached to the trailer 13. More specifically, the first end 33 of the rod member 31 preferably terminates in a ball-like member 37 substantially identical to the ball-like member of a typical ball and socket hinge mechanism and for being coupled to the cup-like member 29 of the tongue structure 23 to thereby pivotally attach the rod member 31 to the tongue structure 23 and the trailer 12. The second end 35 of the rod member 31 is preferably tapered in a somewhat conical manner as indicate by FIG. 2. A transverse aperture 39 preferably extends through the rod member 31 substantially adjacent the second end 35 thereof for reasons which will hereinafter become apparent.

Figure 3:
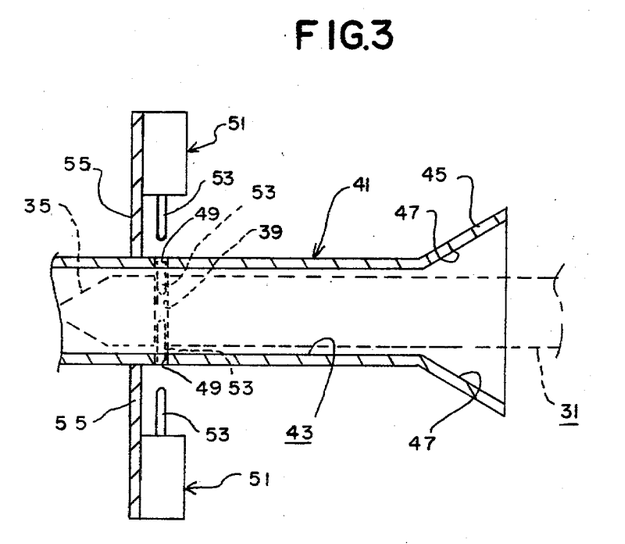
FIG. 3 is a sectional view as taken on line III—III of FIG. 1 with some parts removed and shown in broken lines for clarity.

The hitch means 11 includes a second coupling means 41 attached to the vehicle 15 (see, in general, FIG. 1). The second coupling means 41 preferably has a cavity 43 for receiving the second end 35 of the rod member 31 (see FIG. 3). The second coupling means 41 may consist of a metal tube fixedly attached to the vehicle 15 in any manner apparent to those skilled in the art such as by way of welding, bolts, or the like. The second coupling means 41 preferably includes an alignment funnel means 45 for coacting with the tapered second end 35 of the rod member 31 to align the rod member 31 with the cavity 43. The cavity 43 preferably has an outer end 47 that flares outwardly in a funnel-like manner to define the alignment funnel means 45. The second coupling means 41 preferably has at least one and preferably a pair of transverse apertures 49 extending into the cavity 43 and located so as to be in alignment with the transverse aperture 39 through the rod member 31 when the rod member 31 is positioned within the cavity 43 as shown in FIG. 3 and for reasons which will hereinafter become apparent.

The hitch means 11 includes attachment means for attaching the first and second coupling means 21, 41 to one another. The attachment means consists of any structure apparent to those skilled in the art. For example, the attachment means may consist simply of a bolt member for being manually passed through the transverse apertures 39, 49 when the rod member 31 is positioned within the cavity 43. Preferably, the attachment means includes at least one and preferably a pair of solenoid means 51 (see, in general, FIG. 3). Each solenoid means 51 includes a pin member 53 for selectively extending through one of the transverse apertures 49 and into the transverse aperture 39 as shown by broken lines in FIG. 3 to attach the first and second coupling means 21, 41 to one another. The operation of the solenoid means 51 will hereinafter be explained. The solenoid means 51 are preferably attached to the second coupling means 41 in any manner apparent to those skilled in the art. For example, each solenoid means 51 may be fixedly attached to a boss-like member 55 in any manner apparent to those skilled in the art such as by welding, bolts, or the like. Each boss-like member 55 is in turn fixedly attached to the second coupling means 41 in any manner apparent to those skilled in the art such as by welding.

The hitch means 11 includes an electrically controlled jack means 57 associated with the first coupling means 21 for causing the first coupling means 21 to be raised or lowered with respect to the supporting surface 17 (see, in general, FIGS. 1 and 2). The jack means 57 may be of any construction apparent to those skilled in the art. Preferably, the jack means 57 includes a foot portion 59 and an electrically operable motor member 61 for selectively raising and lowering the foot portion 59 in any manner apparent to those skilled in the art. The foot portion 59 has a supporting surface engaging end 63 for engaging the supporting surface 17 when the foot portion 59 is lowered to thereby cause the first coupling means 21 to be raised with respect to the supporting surface. The jack means 57 is preferably fixedly attached to the tongue structure 23 in any manner apparent to those skilled in the art such as by welding.

Figure 5:
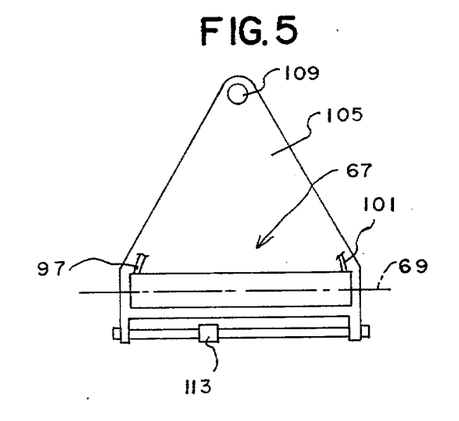
FIG. 5 is a view as taken on line V—V of FIG. 4.
Figure 6:
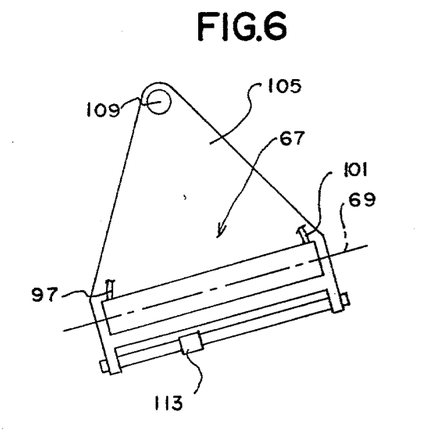
FIG. 6 is a view similar to FIG. 5 but in a moved position.
Figure 12:
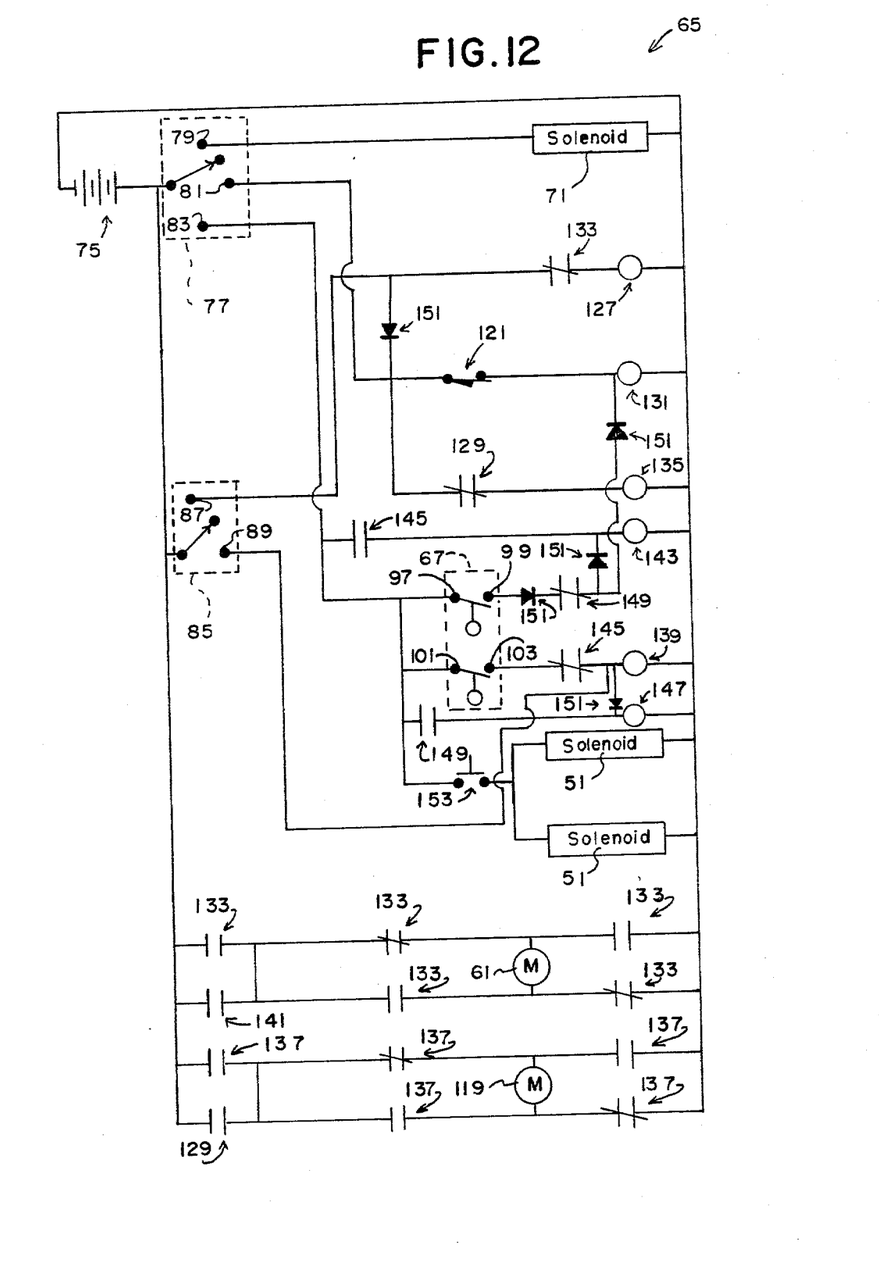
FIG. 12 is a electrical schematic view showing the circuit means of the hitch means of the present invention.

The hitch means 11 includes an electric circuit means 65 (see, in general, FIG. 12). The circuit means 65 includes a pivot switch means 67 for controlling the jack means 57. The pivot switch means 67 has a longitudinal axis as indicated by the broken line 69 in FIGS. 5 and 6. The pivot switch means 57 is pivotally associated with the trailer 13 in a manner which will hereinafter be described for movement with the longitudinal axis 69 of the pivot switch means 67 in a plane parallel to a vertical plane plane extending along the longitudinal axis 19 of the trailer 13.

Figure 4:
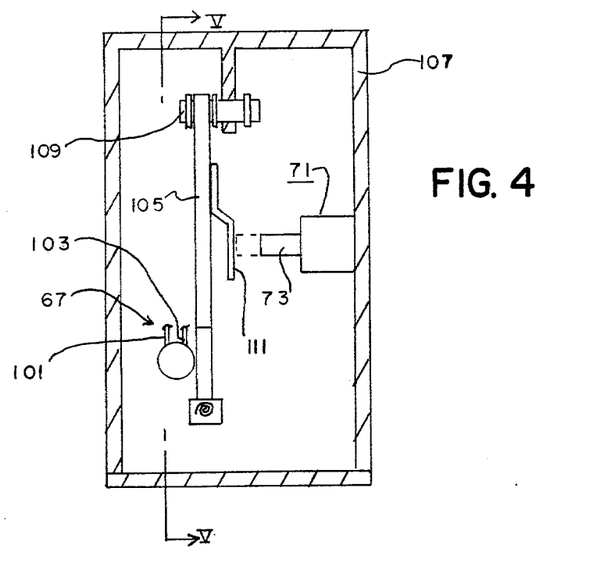
FIG. 4 is a sectional view as taken on line IV—IV of FIG. 1.

The hitch means 11 includes a lock means for locking the pivot switch means 67 in any one of an infinite number of positions with the longitudinal axis 69 of the pivot switch means 67 in the plane parallel to the vertical plane extending along the longitudinal axis 19 of the trailer 13. The lock means preferably includes a solenoid means 71 having a pin member 73 for selectively engaging structure attached to the pivot switch means 67 in such a manner so as to lock the pivot switch means 67 in any one of an infinite number of positions (see FIG. 4).

The circuit means 65 electrically couples the pivot switch means 67 to the motor member 61 of the jack means 57 and to a source of electrical current such as a battery 75 in such a manner that the pivot switch means 67 will activate the jack means 57 whenever electric current from the battery 75 is directed to the pivot switch means 67 and the longitudinal axis 69 of the pivot switch means 67 is not horizontal in a manner which will hereinafter become apparent.

The circuit means 65 includes a first switch means 77 having a first position when a contact 79 is closed, having a second position when a contact 81 is closed and having a third position when a contact 83 is closed (see FIG. 12). When the first switch means 77 is in the first position, the solenoid means 71 of the lock means is activated to pull the pin member 73 away from the pivot switch means 67 whereby the pivot switch means 67 is free to pivot and whereby the pivot switch means 67 will pivot until the longitudinal axis 69 thereof becomes level (i.e., until the longitudinal axis 69 becomes perfectly horizontal) due to the force of gravity. When the first switch means 77 is moved from the first position, the solenoid means 71 will then lock the pivot switch means 67 in that horizontal position. When the first switch means 77 is in the second position, the jack means 57 will be activated to lower the foot portion 59. When the first switch means 67 is in the third position, the pivot switch means 67 will be electrically energized whereby the jack means 57 will be activated if the longitudinal axis 69 of the pivot switch means 67 is not horizontal.

The circuit means 65 preferably includes a second switch means 85 having a first position when a contact 87 is closed and having a second position when a contact 89 is closed (see FIG. 12). When the second switch means 85 is in the first position, the jack means 57 is activated to lower the foot portion 59. When the second switch means 85 is in the second position, the jack means 57 is activated to raise the foot portion 59.

Figure 7:
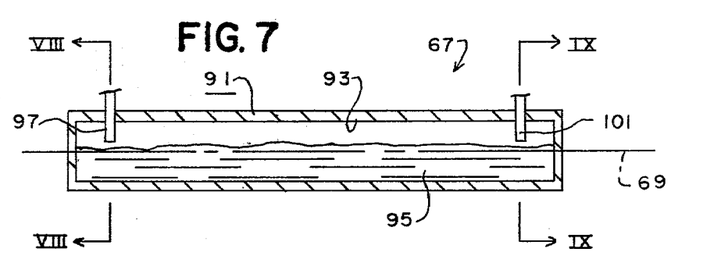
FIG. 7 is an enlarged sectional view of the pivot switch means of the hitch means of the present invention.
Figure 8:
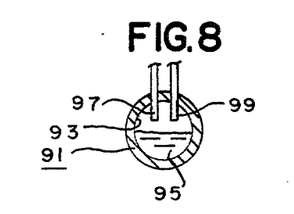
FIG. 8 is a sectional view as taken on line VIII—VIII of FIG. 7.
Figure 9:
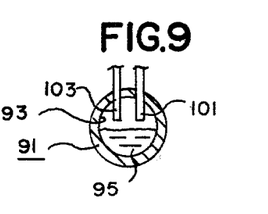
FIG. 9 is a sectional view as taken on line IX—IX of FIG. 7.
Figure 10:
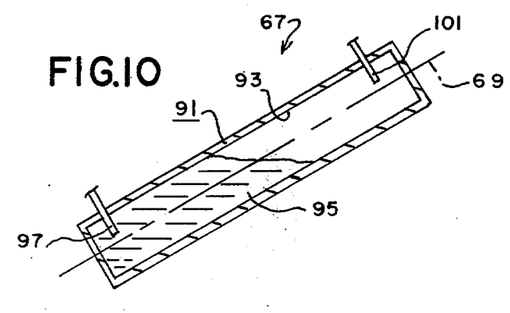
FIG. 10 is a sectional view similar to FIG. 7 but showing the pivot switch means in a moved position.
Figure 11:
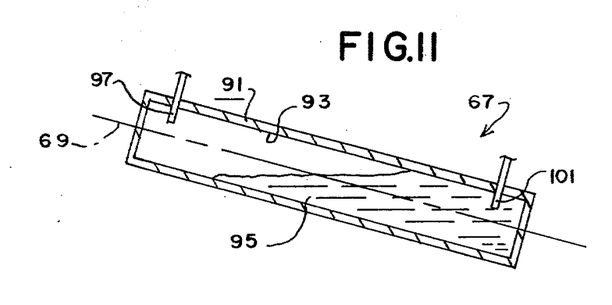
FIG. 11 is a sectional view similar to FIGS. 7 and 10 but showing the pivot switch means in a moved position.

The pivot switch means 67 preferably consists of a standard double-pole mercury switch as diagrammatically depicted in FIGS. 7–11. More specifically, the pivot switch means 67 includes a non-electrically conductive body member 91 having an elongated cavity therein containing a quantity of a liquid electrically conductive substance such as mercury 95 or the like. A first electrical contact 97 and a second electrical contact 99 are located at one end of the cavity 93. A third electrical contact 101 and a fourth electrical contact 103 are located at the other end of the cavity 93. The first and third electrical contacts 97, 101 are electrically coupled to the contact 83 of the first switch means 77 (see FIG. 12). The second and fourth electrical contacts 99, 103 are associated with the motor member 51 of the jack means 57 (see FIG. 12). When the pivot switch means 67 is locked with its longitudinal axis 69 in a horizontal position as shown in FIG. 7, no electrical current will pass between the electrical contacts 97, 99 or 101, 103. However, when the pivot switch means 67 is locked in a position with its longitudinal axis 69, at an angle to the horizontal as indicated in FIG. 10, the mercury 95 will electrically connect the first and second contacts 97, 99 and electrical current will pass between the first and second contacts 97, 99 whereby the jack means 57 will be activated to lower the foot portion 59. On the other hand, if the pivot switch means 67 is locked in a position with its longitudinal axis 69 angled as shown in FIG. 11, the mercury 95 will electrically connect the third and fourth contacts 101, 103 and electrical current will pass between the third and fourth contacts 101, 103 whereby the jack means 57 will be activated to raise the foot portion 59. Thus, the pivot switch means 67 has three distinct positions: a first position as shown in FIG. 11 whereby the jack means 57 will be activated to raise the first coupling means 21, a second position as shown in FIG. 10 in which the jack means 57 will be activated to lower the first coupling means 21, and a third position as shown in FIG. 7 whereby no electrical current passes through the pivot switch means 67.

The body member 91 of the pivot switch means 67 is preferably fixedly attached to a plate member 105 in any manner apparent to those skilled in the art such as by glue or the like. The plate member 105 is in turn pivotally attached to structure 107 by way of a pivot pin 109. The structure 107 is fixedly attached to the trailer 13. For example, the structure 107 may consist of a box-like member which is fixedly attached, for example, inside the trailer 13 or to the jack means 57 in any manner apparent to those skilled in the art such as by welding or the like. The plate member 105 pivots in a direction which allows the pivot switch means 57 to pivot with its longitudinal axis 69 in a plane parallel to a vertical plane extending along the longitudinal axis 19 of the trailer 13. The pin member 73 of the solenoid means 71 coacts with the plate member 105 to lock the pivot switch means 67 in one of an infinite number of positions. The plate member 105 may include a spring-like member 111 for coacting with the pin member 73 (see FIG. 4). A balancing means may be attached to the plate member 105 to allow the plate member 105 to be adjusted to cause the longitudinal axis 69 of the pivot switch means to assume a perfectly horizontal position when the solenoid means 71 is disengaged. The balancing means may consist of a counterweight member 113 slidably positioned on the plate member 105 in any manner apparent to those skilled in the art.

The hitch means 11 may include equalizer bar means 115 associated with the first coupling means 21 in a manner and for reasons which will be apparent to those skilled in the art (see FIGS. 1 and 2). The hitch means 11 may also include an electrically controlled winch means 117 associated with the equalizer bar means 115 for selectively applying tension to the equalizer bar means 115 (see, in general, FIGS. 1 and 2). The winch means 117 includes an electric motor member 119 which is controlled by the circuit means 65. More specifically, the circuit means 65 is adapted to activate the electric motor member 119 of the winch means 117 to release tension on the equalizer bar means 115 when the first switch means 77 is in the second position and is adapted to activate the electric motor member 119 of the winch means 117 to apply tension to the equalizer bar means 115 when the first switch means 77 is in the second position and is adapted to activate the electric motor member 119 of the winch means 117 to apply tension to the equalizer bar means 115 when the second switch means 85 is in the first position. The circuit means 65 includes a limit switch means 121 (see, in general, FIG. 1). The limit switch 121 is mechanically associated with the foot portion 59 of the jack means 57 whereby the limit switch means 121 is opened only when the foot portion 59 of the jack means 57 is fully lowered. The circuit means 65 activates the electric motor member 119 of the winch means 117 to release tension on the equalizer bar means 115 when the first switch 77 is in the second position only when the limit switch means 121 is opened. The limit switch means 121 may be of any construction apparent to those skilled in the art. For example, the limit switch means 121 may include a body member 123 fixedly attached to the tongue structure 23 of the first coupling means 21 and may include an arm member 125 for engaging the foot portion 59 of the jack means 57 and for being received in a cavity or the like (not shown) in the foot portion 59 when the foot portion 59 is fully lowered to thereby open the switch means 121.

The circuit means 65 preferably includes a first relay means composed of a first relay coil 127 and a first relay switch 129, a second relay means composed of a second relay coil 131 and a plurality of second relay switches 133, a third relay means composed of a third relay coil 135 and a plurality of third relay switches 137, a fourth relay means composed of a fourth relay coil 139 and a fourth relay switch 141, a fifth relay means composed of a fifth relay coil 143 and a plurality of fifth relay switches 145, and a sixth relay means composed of a sixth relay coil 147 and a plurality of sixth relay switches 149 electrically coupled as shown in FIG. 12. Diodes 151 are preferably provided at various locations in the circuit means 65 to restrict flow of electrical current in various portions of the circuit means 65 to one direction. The circuit means 65 preferably includes a switch means 153 that may be positioned within the vehicle 15 and for releasing the solenoid means 51. The switch means 153 acts to release the solenoid means 51 only when the first switch means 77 is in the third position.

The first and second switch means 77, 85 may be of the key operated type similar to the ignition switch of an automobile.

The operation of the hitch means of the present invention is as follows: To disconnect the trailer 13 from the vehicle 15 the first step is to move the first switch means 77 to the first position where the solenoid means 71 will disengage from the pivot switch means 67 which will then assume a position with its longitudinal axis 69 perfectly horizontal. The first switch means 77 is then moved from the first position whereupon the solenoid means 71 will lock the pivot switch means 67 in that particular horizontal position. Next, the first switch means 77 is moved to the second position whereupon the second relay coil 131 will be energized causing the electric motor member 61 to lower the foot portion 59 of the jack means 57 until the foot portion 59 is fully lowered whereupon the limit switch means 121 will open and whereupon the first relay coil 127 is energized to cause the electric motor member 119 to release tension on the equalizer bar means 115. The first switch means 77 is then moved to the third position whereupon the pivot switch means 67 will be activated causing the current to pass between the electrical contacts 101, 103 and energizing the fourth relay coil 139 whereupon the electric motor means 51 will be activated and will raise the foot portion 59 until the pivot switch means 67 reaches a horizontal position. The switch means 153 is then closed to cause the solenoid means 51 to disengage whereby the trailer 13 is disconnected from the vehicle. The trailer 13 can then be leveled with respect to the supporting surface 17 by moving the second switch means 85 to the first position so that the second relay coil 131 is energized thereby causing the electric motor member 61 to lower the foot portion 59 and thereby raise the front end of the trailer 13; or by moving the second switch means 85 to the second position whereupon the electric motor member 61 will cause the foot portion 59 to be raised thereby lowering the front end of the trailer 13. To reconnect the trailer 13 and vehicle 15, the first step is to move the first switch means 77 to the third position whereupon the pivot switch means 67 is energized to cause the jack means 57 to raise or lower the front end of the trailer 13 until the longitudinal axis 69 of the pivot switch means 67 is again horizontal to it. The switch means 153 is again closed and the vehicle 15 is backed up so that the second end 35 of the rod member 31 extends into the cavity 43 of the second coupling means 41. The switch means 153 is then released, causing the solenoid means 51 to attach the trailer 13 to the vehicle 15. The second switch means 85 is then moved to the first position whereupon the foot portion 59 of the jack means 57 is fully lowered and the winch means 117 applies tension to the equalizer bar means 115. The second switch means 85 is then moved to the second position whereupon the foot portion 59 of the jack means 57 is fully retracted. The trailer 13 is now ready to be towed by the vehicle 15.

Although the present invention has been described and illustrated with respect to a preferred embodiment thereof, it is not to be so limited since changes and modifications may be made therein which are within the full intended scope of the invention.

We claim:
1. Hitch means for removably connecting a trailer to a vehicle, said trailer having a longitudinal axis and resting upon a supporting surface, said hitch means comprising:
    (a) first coupling means attached to said trailer;
    (b) second coupling means attached to said vehicle;
    (c) attachment means for attaching said first and second coupling means to one another;
    (d) equalizer bar means for being associated with said first coupling means;
    (e) electrically controlled winch means for being associated with said equalizer bar means for selectively applying tension to said equalizer bar means;
    (f) electrically controlled jack means associated with said first coupling means for causing said first coupling means to be raised or lowered with respect to said supporting surface;
    (g) electric circuit means, said circuit means including a pivot switch means for controlling said jack means, said pivot switch means having a longitudinal axis and being pivotally associated with said trailer for movement with said longitudinal axis of said pivot switch means in a plane parallel to a vertical plane extending along said longitudinal axis said trailer, said pivot switch means activating said jack means whenever electric current is directed to said pivot switch means and said longitudinal axis of said pivot switch means is not horizontal, said pivot switch means having a first position and a second position and a third position, said jack means being activated to raise said first coupling means when said pivot switch means is in said first position, said jack means being activated to lower said first coupling means when said pivot switch means is in said second position, no electrical current passing to said jack means when said pivot switch means is in said third position, said electric circuit means controlling said winch means; and
    (h) lock means for locking said pivot switch means in any one of an infinite number of positions with said longitudinal axis of said pivot switch means in said plane parallel to said vertical plane extending along said longitudinal axis of said trailer.

2. The hitch means of claim 1 in which said electric circuit means includes a first switch means and a second switch means; and in which said jack means includes a foot portion; said first switch means having first, second and third positions; said lock means being disengaged when said first switch means is in said first position and being engaged when said first switch means is in said second or third position; said jack means being operable to raise and lower said foot portion; said jack means being activated to lower said foot portion when said first switch means is in said second position; said winch means being activated to release tension on said equalizer bar means when said first switch means is in said second position; said pivot switch means being electrically energized with said first switch means is in said third position; said second switch means having first and second positions; said jack means being activated to lower said foot portion when said second switch means is in said first positions; said winch means being activated to apply tension to said equalizer bar means when said second switch means is in said first position; said jack means being activated to raise said foot portion when said second switch means is in said second position.

3. The hitch means of claim 2 in which said circuit means includes a limit switch means, said limit switch means being open only when said foot portion of said jack means is fully lowered, said winch means being activated to release tension on said equalizer bar means when said first switch means is in said second position only when said limit switch means is open.

4. The hitch means of claim 3 in which said attachment means includes solenoid means for attaching said first and second coupling means together and includes a solenoid switch means said solenoid means being activated to release said first and second coupling means from one another only when said first switch means is in said third position and said solenoid switch means is closed.

5. The hitch means of claim 4 in which said first coupling means includes a rod member having a first end and a second end, said first end of said rod member being attached to said trailer, in which said second coupling means has a cavity for receiving said second end of said rod member, said second end of said rod member being tapered, and in which said second coupling means includes an alignment funnel means for coacting with said tapered second end of said rod member to align said rod member with said cavity.

6. The hitch means of claim 5 in which second end of said rod member has a transverse aperture therethrough; in which said second coupling means has a transverse aperture extending into said cavity; and in which said solenoid means of said attachment means includes a pin member for extending into said transverse apertures of said rod member and said second coupling means to attach said first and second coupling means to one another.

* * * * *